Aug. 12, 1969 N. GOLD 3,460,453
VARIABLE LENGTH CONTROL FOR PHOTOGRAPHIC APPARATUS
Filed Aug. 23, 1967 3 Sheets-Sheet 2
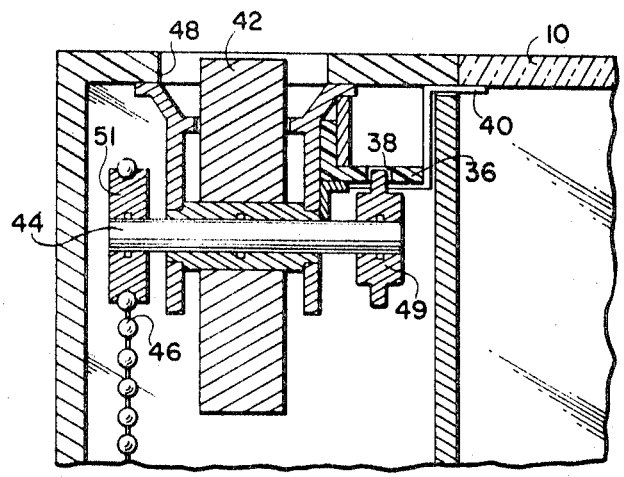
FIG. 3
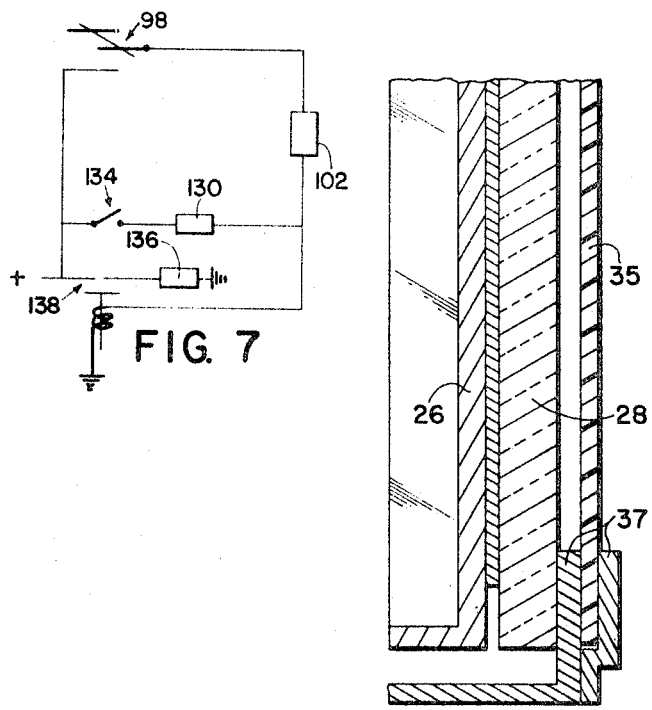
FIG. 7
FIG. 2
INVENTOR
Nicholas Gold
BY Brown and Mikulka
and
Alfred E. Corrigan
ATTORNEYS Aug. 12, 1969    N. GOLD    3,460,453
VARIABLE LENGTH CONTROL FOR PHOTOGRAPHIC APPARATUS
Filed Aug. 23, 1967    3 Sheets-Sheet 3

INVENTOR.
Nicholas Gold
BY
Brown and Mikulka
and
Alfred E. Corrigan
ATTORNEYS

United States Patent Office 3,460,453
Patented Aug. 12, 1969

3,460,453
VARIABLE LENGTH CONTROL FOR PHOTOGRAPHIC APPARATUS
Nicholas Gold, Arlington, Mass., assignor to Polaroid Corporation, Cambridge, Mass., a corporation of Delaware
Filed Aug. 23, 1967, Ser. No. 662,632
Int. Cl. G03b 17/52
U.S. Cl. 95—14                                    12 Claims

ABSTRACT OF THE DISCLOSURE

A photographic apparatus for exposing and processing sections of a photosensitive sheet in accordance with the area exposed. The apparatus includes a blade for severing successive areas of the sheet subsequent to exposure, a switch for actuating the blade and, switch actuating members. The switch and actuating members are mounted for movement relative to each other and a control is provided for adjusting the position of the switch relative to one of the actuating members in accordance with the length of the area of the photosensitive sheet to be exposed. Upon exposing the section one of the actuating members is moved to a position wherein it actuates the switch as it is moved past the switch.

---

An object of the invention is to provide, in photographic apparatus of the type described including means for exposing successive areas of a photosensitive sheet and processing means for treating sections of said sheet, each including an exposed area, with a processing liquid, novel and improved means for varying the length of each exposed area coupled with said processing means for varying the length of each processed section in accordance with the length of the exposed area thereof.

Another object of the invention is to provide, in apparatus as described, novel length control means for continuously varying the lengths of the copies processed.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIG. 2 is an enlarged sectional view taken substantially along the line 2—2 of FIGURE 1 showing details of a portion of the apparatus;

FIG. 3 is an enlarged sectional view taken substantially along the line 3—3 of FIGURE 1 showing details of another portion of the apparatus;

FIG. 7 is a schematic representation of a circuit embodied in the instant invention.

Figure 1:
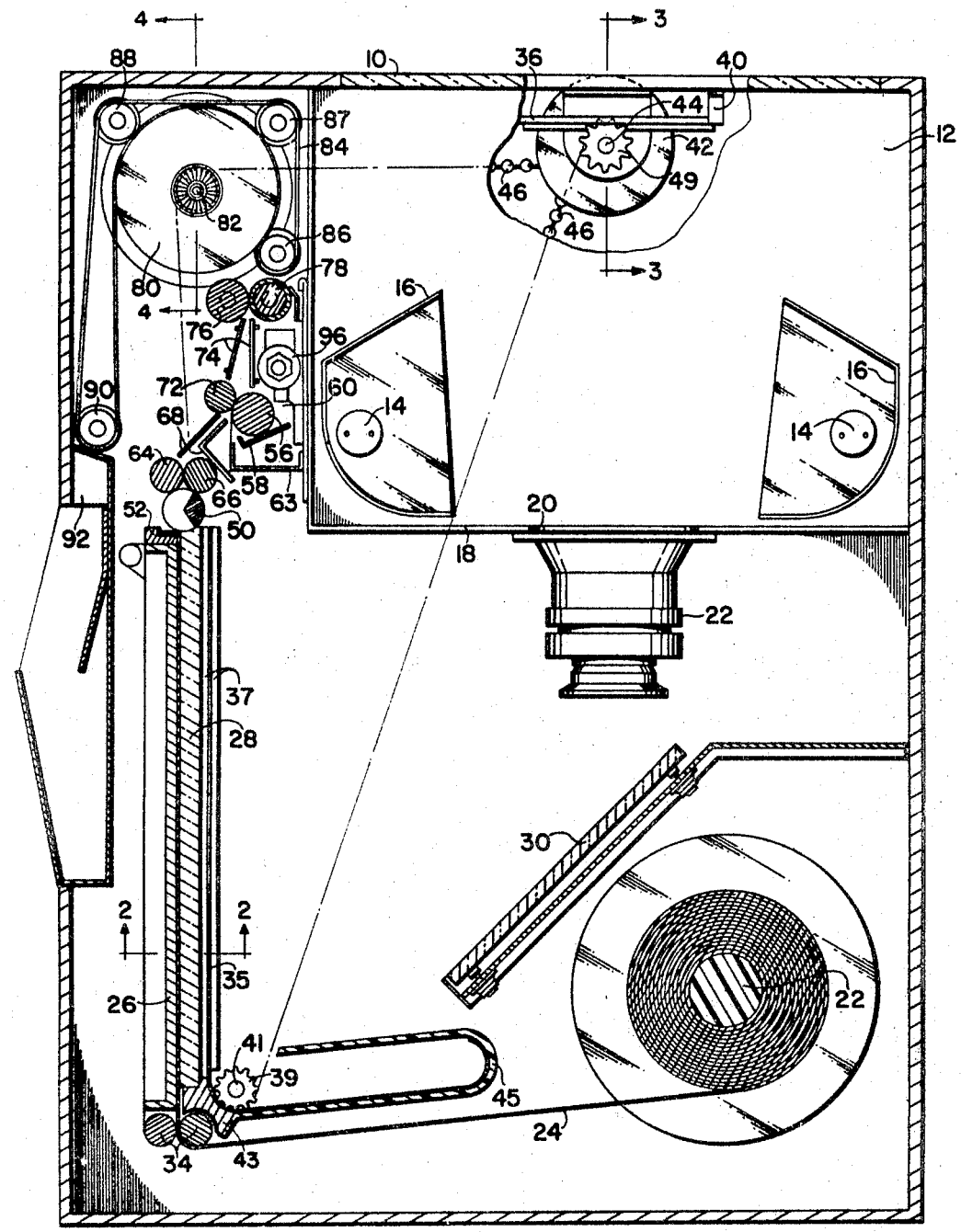
FIGURE 1 is a sectional, elevational view of photographic document copying apparatus embodying the invention.

The document copying apparatus of the invention is shown in FIGURE 1 as comprising an exposure system including a generally horizontal transparent window 10 comprising the upper wall of a chamber 12 in which lamps 14 and reflectors 16 are mounted for illuminating subject matter, especially graphic material, on the upper surface of window 10. The chamber is definitely by walls comprising the housing of the apparatus including a lower wall 18 provided with a centrally located opening 20 in which is mounted an objective lens and shutter assembly 22 of a conventional type employed in photography. The apparatus is primarily intended to photograph graphic materials, particularly documents, pages of books, and the like which are rectangular in shape, and accordingly, window 10 is rectangular in shape and has length and width dimensions at least equal to those of the largest document to be reproduced, e.g., 11 x 14 inches.

Means are provided for supporting successive sections of a light-sensitive, image-recording sheet, designated 24, in position for exposure to light from an original positioned on window 10 and transmitted by lens 22. These means include a generally planar support plate 26 mounted with a surface thereof in a vertical plane facing lens 22, and a transparent plate 28 located in juxtaposition with the surface of the support plate. A mirror 30 is mounted at a 45° angle with respect to the axis of lens 22 and the plane of support plate 26 beneath the lens for redirecting light from the lens toward the support plate and a section of the photosensitive sheet positioned thereon. Mirror 30 also produces the geometric image reversal required for a correct copy of the original. Photosensitive sheet 24 is advanced from the spool upwardly between the support plate and the transparent plate by transport means in the form of a pair of driven feed rolls designated 34.

In a document copier designed to produce copies having a one-to-one size correspondence with the original, photosensitive sheet 24 is at least equal in width to window 10 and the widest document to be copied, and transparent plate 28 is at least equal in width and length to window 10 so that during each exposure the entire area of the section of the photosensitive sheet located behind transparent plate 28 on support plate 26 is exposed to light reflected from subjects located outside of window 10. It is frequently desirable to produce copies of originals that are substantially smaller than window 10 and transparent plate 28 and this practice would normally result in exposure of the entire area of the sheet located behind plate 28 and result in substantial waste of the photosensitive sheet material. Provision is made in the document copier of the invention for varying the length of the area of the photosensitive sheet exposed in order to conform more approximately with the length of the original being copied and thereby reduce wastage of the photosensitive sheet material. In the copending U.S. patent application of Nicholas Gold et al., Ser. No. 544,774, filed Apr. 25, 1966, a system for controlling the length of the exposed photosensitive sheet is disclosed comprising a curtain movable across the underside of window 10 within chamber 12 for obscuring a portion of the window and preventing exposure of the photosensitive sheet by light entering the obscured portion of the window. The curtain is coupled with the processing mechanism of the apparatus so that only the exposed length of the photosensitive sheet is processed thereby making possible the saving in sheet material.

A certain amount of stray light is present both within chamber 12 and within the part of the apparatus including lens 22, mirror 30, and plates 26 and 28, and despite various provisions for absorbing all this light, such as forming the curtain underlying window 10 of a highly absorbative material, it has been found that this stray light may be sufficient to produce an undesired exposure of the photosensitive sheet material, particularly when the sheet material is highly sensitive. In the document copier of the invention, the curtain for preventing exposure of a portion of the section of the photosensitive sheet located for exposure behind plate 28 is located in front of and closely adjacent transparent plate 28 in order to prevent exposure of the photosensitive sheet by stray light within the housing of the apparatus. This curtain, designated 35, is mounted for sliding movement closely adjacent the surface of transparent plate 28 within a pair of tracks 37 at the lateral edges of the transparent plate. Curtain 35 is formed of a resilient, flexible sheet material, preferably one of the organic plastics such as the vinyls, or polypropylene, is opaque and is provided along its lateral edges with sprocket holes. A pair of toothed sprockets 39 are mounted on a shaft 41 adjacent the lower ends of tracks 37 with the teeth engaged in the sprocket holes in curtain 35, the latter being supported against the sprockets by a guide member 43. The position of curtain 35 with respect to transparent plate 28 thus can be altered by rotating sprockets 39 and a chamber 45 is provided for holding that portion of the curtain which is not disposed in front of the transparent plate. The leading edge of the curtain is preferably straight and extends perpendicularly to the direction of movement of the photosensitive sheet between plates 26 and 28 to provide for a rectangular exposed area.

The apparatus includes means associated with window 10 for indicating to the operator the location of the leading edge of the curtain to enable the operator to move the curtain so that the leading edge thereof coincides with an edge of the image of the original positioned for exposure on window 10. The indicator means comprise an elongated strip 36 provided with sprocket holes 38 mounted for lengthwise movement in a track adjacent one side of window 10. Strip 36 includes a pointer or indicator 40 on one end extending towards the opposite side of window 10 so as to be visible within the window adjacent the edge thereof for indicating the relative position of the leading edge of the curtain. The apparatus includes means providing for manually controlling the position of curtain 35 and indicator 40. These means comprise a disc 42 mounted for rotation about the axis of shaft 44 adjacent the upper wall of the housing of the apparatus with the upper portion of disc 42 projecting through an opening 48 in the upper wall where the disc may be engaged manually and rotated. Disc 42 is keyed to shaft 44 such that the two rotate as a unit. A toothed sprocket 49 is mounted on shaft 44 with the teeth engaged in the sprocket holes in strip 36 for moving the strip lengthwise to vary the position of pointer 40. Shaft 44 is coupled with shaft 41 by means for rotating the latter in response to rotation of shaft 44 and in the form shown comprises a bead chain 46 engaged with a bead chain sprocket 51 mounted on shaft 44 and a bead chain sprocket mounted on shaft 41.

The apparatus includes a processing section in which a liquid processing composition is applied to one side of the exposed photosenstive sheet for permeation into the sheet to effect formation of a visible image. Following exposure, the exposed section of the photosensitive sheet located between plates 26 and 28 is advanced upwardly between a rotary knife 50 and anvil 52 into the processing section of the apparatus while another section of the photosensitive sheet is advanced upwardly between the two plates into position for exposure. When the exposed section of the photosensitive sheet has passed between the knife and anvil, the knife is rotated to sever the section of the sheet from the remainder of the photosensitive sheet located between the plates at approximately the trailing edge of the exposed area and movement of the photosensitive sheet by feed rolls 34 is discontinued. The severed section of the photosensitive sheet continues to be moved through the processing section of the apparatus where it is treated with a liquid to produce a visible image.

The means for applying the processing liquid may take a number of different forms, such as shown, for example, in U.S. Patent No. 3,330,196 granted to Richard J. Chen et al., or it may take the form shown, for example, in the drawings herein. The processing system shown is adapted to apply a nonviscous liquid to the exposed side of the photosensitive sheet and is of the type described together with processes and the materials useful therein in the copending U.S. application Ser. No. 368,622 of Edwin H. Land, and Ser. No. 368,621 of Edwin H. Land et al., both filed May 19, 1964, now abandoned. These applications describe an image-receiving sheet comprising a support and at least a layer containing a light-sensitive material, such as silver halide, and an outer layer comprising a translucent material such as finely divided titanium dioxide dispersed in a suitable, permeable, colloidal carrier or matrix such as gelatin which is permeable to an aqueous processing liquid. The translucent pigment may be incorporated in the layer containing the light-sensitive material and/or may comprise a separate outer layer which may also contain silver precipitating nuclei, and is sufficiently transparent to permit exposure of the light-sensitive layer therebeneath while being sufficiently opaque to provide the requisite background for a positive silver image transferred thereto by diffusion and to mask a negative image formed thereunder. The processing liquid preferably comprises an aqueous solution of a silver halide complexing agent, is supplied to the side of the sheet opposite the support for absorption into the light-sensitive layer in sufficient quantity to produce a silver transfer image on the surface of the translucent layer.

The processing liquid may be nonviscous, i.e., have the viscosity of water, or it may include a film-forming agent and range in viscosity from that of water to a viscosity of 200,000 centipoises at 20° C. The operation and construction of the liquid applicator will depend to a large extent upon the nature and viscosity of the liquid, but in any event, will be designed to apply the processing liquid to at least the exposed (rectangular) area of each section of the photosensitive sheet as the section is advanced through the processing section of the apparatus.

The means shown in this application for applying a nonviscous processing liquid to the sheet include a cylindrical applicator roll 56 mounted for rotation about a substantially horizontal axis, a plate 58 mounted intermediate its lateral edges beneath the applicator roll for pivotable movement about an axis substantially parallel with the axis of rotation of the applicator roll, and a pair of end members 60 for engaging the roll at the ends of the cylindrical portion thereof. Plate 58, in the operative position shown in FIGURE 1 is disposed with its upper surface tangent with the peripheral surface of the roll and cooperates therewith and with end members 60 to form a trough into which may be introduced a predetermined quantity of processing liquid sufficient to treat a predetermined length of the photosensitive sheet.

Excess liquid may be disposed of and the applicator roll cleaned by pivoting plate 58 to dump excess liquid into a container 63 provided beneath the plate for this purpose. The liquid deposited in the trough is applied to a sheet by rotating roll 56 (in a counterclockwise direction) to apply the liquid as a thin layer to the peripheral surface of the roll and advancing the sheet relative to and past the roll in the opposite direction in contact with the peripheral surface of the roll to transfer the liquid from the roll to the sheet. A pair of juxtaposed feed rolls 64 and 66 mounted above knife 50 are provided for advancing each section of the photosensitive sheet from between the knife and anvil upwardly toward the applicator roll, and guides 68 are provided on opposite sides of the path of movement of the sheet between the feed rolls for guiding the sheet along a path tangent with the portion of the peripheral surface of applicator roll 56 lying opposite plate 58. A backing roll 72 is provided mounted in juxtaposition with applicator roll 56 for guiding and supporting the sheet against the applicator roll together with means for rotating roll 72 for advancing the sheet upwardly against the applicator roll.

From the applicator roll the sheet being treated is moved upwardly between guides 74 into the nip of a pair of rolls 76 and 78 which serve to advance the sheet upwardly and, as described in the aforementioned U.S. Patent No. 3,330,196, function as a wringer to remove excess processing liquid from the surface of the sheet. Processing of the sheet requires that the sheet remain in a dark environment during a processing period of predetermined duration, and for this purpose, the apparatus includes means defining a path of predetermined length along which each sheet is advanced from between rolls 76 and 78 within the apparatus at a speed calculated to provide the necessary processing period. These means comprise a cylindrical drum 80 mounted for free rotation on a shaft 82, and a plurality of endless belts 84, each including a portion engaged around a portion of the periphery of drum 80, and a return portion supported on pulleys 86, 87, 88 and 90. A sheet 24 is advanced by rolls 76 and 78 upwardly into the nip between drum 80 and belts 84, at pulleys 86, is advanced along a cylindrical path defined by the periphery of drum 80 from pulleys 86 past pulleys 88 to the point at which belts 84 are tangent with the drum. The belts are advanced to rotate drum 80 in a counterclockwise direction and move the sheet gripped between the belts and drum along a circular path of about 230° around the periphery of the drum and thence downwardly from engagement with the drum and through an opening 92 in the housing located beneath and adjacent pulleys 90, the sheets having a tendency to adhere to the belts until the belts are guided around pulleys 90. A plurality of narrow belts are preferred to a single belt in order to limit the area of contact between the sheet and the belts and thereby facilitate drying of the sheet and separation of the sheet from the belts.

The length of each area of sheet 24 processed should be approximately coextensive with the area exposed, and is controlled by cutting each section of the photosensitive sheet to the same length as the uncovered area of window 10 and metering the quantity of processing liquid dispensed into the trough defined by plate 58 for application to each section of sheet 24. Thus, a saving will be effected in both the sheet material and the processing liquid employed. The processing liquid is dispensed in controlled quantities by a solenoid actuated valve 96 located above the trough. The length of each section of sheet 24 is determined by the angular relationship between knife microswitch 98 and switch actuating means 100 as will be more fully explained hereinafter.

The quantity of processing liquid dispensed by valve 96 is a function of the length of time the valve is open and is determined by a variable timer of a conventional type provided for controlling the operation of the solenoid actuated valve. Bead chain 46 is coupled with the timer for varying the duration of the open period of valve 96 in accordance with the position of the curtain so that the quantity of liquid dispensed for application to each exposed area of the photosensitive sheet bears a direct relationship to the length of the area as defined by the curtain.

Knife 50 is preferably electrically controlled, e.g., by means such as a solenoid or relay 102, in turn controlled by microswitch 98. Microswitch 98 is mounted on a face 104 of a cylindrical support member 106 and is connected to knife 50 by wires 107 passing through aperture 109 in support member 106. Support member 106 includes a hub 108 which is mounted on shaft 82 for rotation thereabout independent of the rotation of shaft 82. Extending from the face 104 of support member 106 is an annular flange 110, 112, portion 110 of which is axially spaced from face 104. Flange portion 112 has an annular bead socket 114 for receiving bead chain 46. Flange portion 110 has an opening 116 therein, the function of which will be explained shortly. Means 118 are provided on shaft 82 for preventing longitudinal movement of support member 106 along shaft 82.

Figure 5:
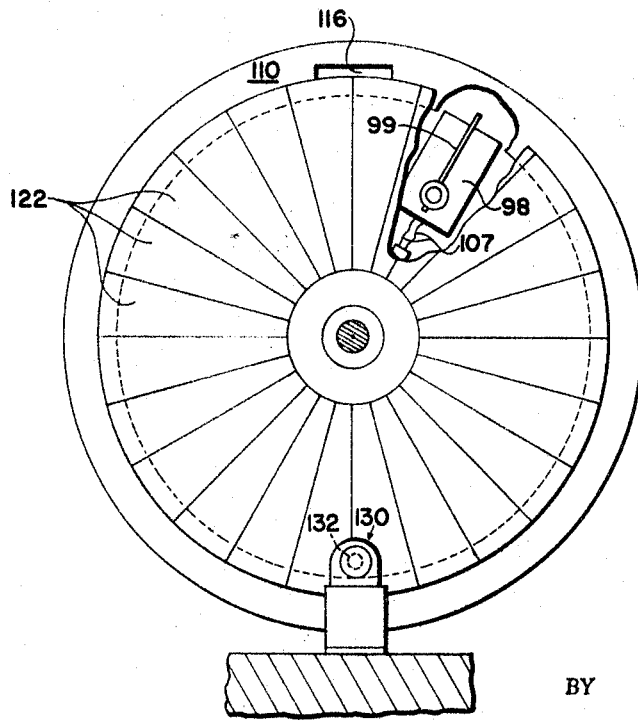
FIG. 5 is an enlarged end view, partly in section, of part of the length control means embodied in the instant invention.

Mounted adjacent support member 106 for rotation with shaft 82 is a support member 120 and switch actuating members 122. Switch actuating members 122 are formed by cutting sector-shaped sections from a unit part in the shape of a disc. The cuts extend radially inwardly from the periphery of the disc to a point short of its center, as shown in FIG. 5. The disc may be manufactured from a resilient material such that the resiliency of the material will maintain the individual switch actuating members 122 in one plane. The disc containing members 122 is provided with a central opening 124 through which member 126 of support member 120 is inserted. An annular member 128 is then placed on the opposite side of the disc to sandwich part of the disc therebetween. Suitable means, e.g., bolts 129, may be utilized for connecting members 128 and 120 on opposite sides of switch actuating means 100. Support member 120 is connected to shaft 82 by means of bolt 131.

Figure 4:
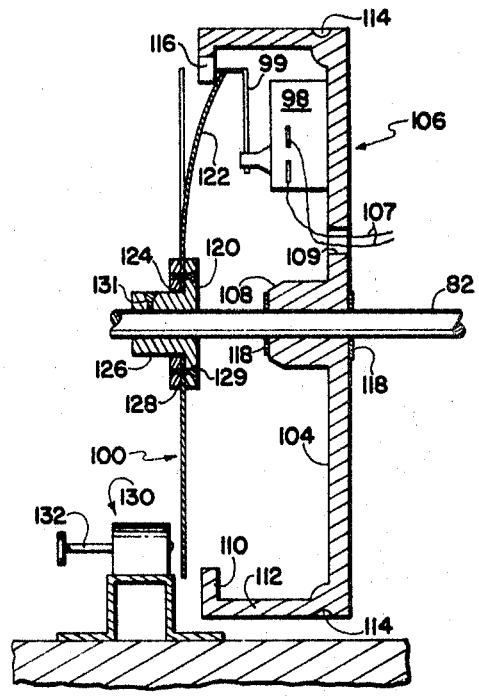
FIG. 4 is an enlarged sectional view taken substantially along the line 4—4 of FIGURE 1.

Mounted adjacent switch actuating means 100 is a displacement means in the form of a solenoid 130 having a plunger 132 operatively coupled therewith. When the circuit to solenoid 130 is closed, e.g., by momentarily closing contact 134, plunger 104 moves to the right, as viewed in FIG. 4, to move one of the switch actuating members 122 over flange portion 110. At this point it should be noted that the radial extent of switch actuating members 122 from the axis of shaft 82 is greater than the inside radius of flange portion 110 as measured from said axis but less than the radial extent of opening 116 from said axis.

Referring to FIG. 7 it will be seen that a clutch motor 136 is provided with an electromagnetic switch 138. Clutch motor 136 is connected to rolls 34 and shaft 82 by any suitable means.

The operation of the above-described embodiment will now be described. The operator of the apparatus places the object to be exposed upon window 10 and rotates disc 42 to position indicator 40 in accordance with the length of the area to be exposed. For example, as viewed in FIGURE 1, clockwise rotation of disc 42 will cause sprocket 49 to rotate in a clockwise manner thereby moving indicator 40 to the right. Bead chain 46 will rotate bead chain sprockets 39 and 114 in a counterclockwise manner. Rotation of sprocket 39 in a counterclockwise manner will cause curtain 35 to be lowered thereby uncovering a correspondingly larger area of photosensitive sheet 24. Counterclockwise rotation of chain sprocket 114 will cause similar rotation of support member 106 to thereby angularly space microswitch 98 from solenoid 130. For example, in FIG. 4, microswitch 98 is angularly spaced 180° from solenoid 130. The operator next closes momentary contact 134 to complete the circuit through solenoid 130 and simultaneously actuate shutter means 22. Solenoid 130 being activated will move plunger 132 to the right deflecting one of the switch actuating members or fingers 122 over the adjacent flange portion 110. Momentary contact 134 will open the circuit through solenoid 130 after a predetermined time. Next, contact 138 will be closed thereby completing the circuit through clutch motor 136. Clutch motor 136 now drives rolls or transport means 34 to advance the exposed section of sheet 24 past the knife 50. Clutch motor 136 will also now drive shaft 82 to rotate switch actuating means 100. As can be seen, the length of exposed sheet 25 allowed to pass knife 50 is determined by the angular relationship between the deflected switch actuating member 122 and microswitch 98. The deflected finger 122 lying to the right of flange portion 110 is rotated in a counterclockwise manner until it contacts switch member 99 of microswitch 98. As will be apparent from FIG. 7, switch 98 will now be moved to the closed position due to said actuating finger 122 contacting member 99. The circuit through knife solenoid 102 now being completed, knife 50 is actuated to sever the exposed section from the remainder of sheet 24. Simultaneously with the activation of solenoid 102 the circuit about electromagnetic switch 138 is completed thereby opening the circuit to clutch motor 136 and stopping the drive to rolls 34 and shaft 82. The exposed section is then transported through the liquid applicator section, the drying section comprised of drum 80 and subsequently delivered to the operator via opening 92.

When a second object is placed on glass 10 to be photo-exposed, the same steps are repeated. Note, actuation of solenoid or displacement means 130 will now cause a second switch actuating member 122 to be deflected to the right side of flange portion 110. Subsequent rotation of switch actuating means 100 will rotate the first deflected finger 122 past switch 98 until it is in alignment with opening 116 in flange portion 110. Switch actuating member 122 will now be able to return to its original position, i.e., in the plane containing the other members 122, due to (1) its resiliency and (2) because the radial extent of said member 122 as measured from the axis of shaft 82 is less than that of opening 116.

Figure 6:
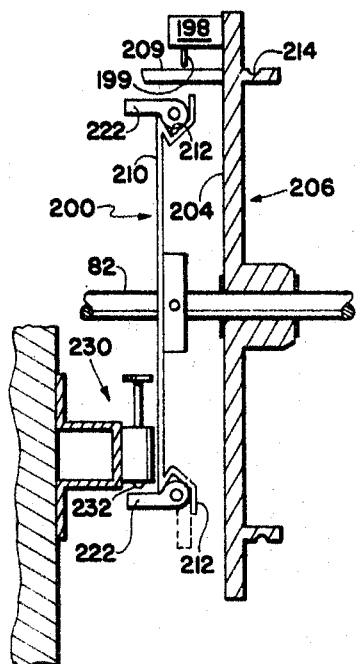
FIG. 6 is a view similar to FIG. 4 showing another embodiment of the instant invention.

FIG. 6 shows a modified type of control means wherein a support member 206 is mounted for independent rotation on shaft 82. Member 206 has means 214 in the form of a bead chain sprocket for receiving bead chain 46. Mounted on face 204 of support member 206 is a microswitch 198 having an arm 199. Also mounted on said face 204 is a cam means 209. Mounted coaxially with and adjacent to support member 206 is a switch actuating means 200 comprised of a support member 210 suitably connected to shaft 82 for rotation therewith. Near the periphery of member 210 is an annular recess 212 for receiving a plurality of switch actuating members 222 which extend about the entire periphery of member 210. Members 222 are spring loaded to maintain them in the position shown. Mounted adjacent switch actuating means 200 is a displacement means in the form of a solenoid 230 having a plunger 232. Solenoid 230 operates in a manner similar to that of solenoid 130.

The operation of the embodiment of FIG. 7 is as follows. The angular position of microswitch 198 relative to solenoid 230 is determined by the adjustment made by the control means, i.e., members 42, 46, 39, 49, 214, etc. Solenoid 230 is actuated, moving plunger 232 against one of the switch actuating members 222 thereby moving the member 222 from a position wherein it is incapable of contacting switch member 199 to a position (dotted line position in FIG. 6) where it forms a radial extension of support means 210 and is capable of actuating switch 198. As before, switch 138 is closed energizing clutch motor 136 to drive rolls 34 and shaft 82. Support 210 and extended finger 222 rotate with shaft 82 until switch actuating member 222 actuates switch 198 via contacting member 199. Actuation of switch 198 operates knife 50 to sever the exposed section from sheet 24. Any subsequent rotation of switch actuating means 200 will bring the extended switch actuating member 222 into contact with cam 209 which will return the extended switch actuating member to its inoperative position.

Although mechanical means, i.e., plungers 132 and 232 have been shown as the means for moving the switch actuating members to the operative position it should be obvious that the invention is not so restricted. For example, magnetic means could be used for moving the switch actuating members into the operative position without there being any physical contact between the switch actuating member and the microswitch.

It will be seen that the invention provides a simple and reliable exposure and processing system requiring that the operator rotate a single disc 42 to vary the length of the area of the photosensitive sheet exposed, the length of the section severed from the remainder of the sheet, and the quantity of processing liquid dispensed for application to the sheet so that the length of the exposed area and severed section correspond and the quantity of liquid closely approximates that required to treat each particular exposed area.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. In photographic apparatus for exposing and processing successive areas of a photosensitive sheet to produce images therein, means for controlling the length of each processed area comprising, in combination:

transport means for moving successive areas of a photosensitive sheet through said apparatus;

exposure means for exposing said successive areas;

processing means including length control means for varying the length of each of said successive areas of said sheet processed subsequent to exposure;

switch means for actuating said length control means adjustably mounted for movement about an axis;

control means for adjusting the position of said switch means in accordance with the length of an area to be exposed;

a plurality of switch actuating members;

support means mounting said switch actuating members for movement about said axis;

displacement means mounted adjacent said switch actuating members for moving one of said members from a first inoperative position to a second position wherein said member is in position for actuating said switch means during rotation of said member about said axis; and drive means coupled with said transport means for rotating said members relative to said switch means to bring said one member into position for actuating said switch means.

2. Photographic apparatus as defined in claim 1 wherein said switch actuating members are integral members of a unit part.

3. Photographic apparatus as defined in claim 2 wherein said members are formed of a resilient material for maintaining said members in said first position.

4. Photographic apparatus as defined in claim 3 including means for allowing said one member to return to said first position subsequent to activation of said switch means by said one member.

5. Photographic apparatus as defined in claim 4 wherein said last-mentioned means comprises flange means having an opening therein, said flange means being interposed between said members and said switch means when said members are in said first position.

6. Photographic apparatus as defined in claim 1 wherein said members are mounted on said support means for movement between a first position in which they are incapable of actuating said switch means and a second position in which they form radial extensions of said support means whereby they are capable of actuating said switch means.

7. Photographic apparatus as defined in claim 6 including means for moving said members from said second position to said first position subsequent to actuation of said switch means.

8. Photographic apparatus as defined in claim 7 wherein said last-mentioned means comprises cam means.

9. Photographic apparatus as defined in claim 1 wherein said length control means comprises cutting means for severing each of said successive areas of said sheet subsequent to exposure.

10. In photographic apparatus for exposing and processing successive areas of a photosensitive sheet to produce images therein, means for controlling the length of each processed area comprising, in combination:

transport means for moving successive areas of a photosensitive sheet through said apparatus;

exposure means for exposing said successive areas;

processing means including length control means for varying the length of each of said successive areas of said sheet processed subsequent to exposure;

first support means rotatably mounted about an axis, said support means including a surface and annular flange means axially spaced from said surface, said flange means having an inside radius;

means defining an opening in said flange means;

switch means for said length control means mounted on said surface;

control means for adjusting the position of said switch means in accordance with the length of an area to be exposed;

second support means having radially extending resilient fingers mounted adjacent to and coaxially with said flange means, the radial extent of said fingers as measured from said axis being slightly greater than said inside radius of said flange means;

displacement means mounted adjacent said fingers for moving one of said fingers past said flange means towards said surface; and drive means coupled with said transport means for rotating said fingers relative to said switch means for moving said one finger into position for actuating said switch means.

11. Photographic apparatus as defined in claim 10 wherein said opening is angularly spaced from said switch means in the direction of rotation of said fingers, said opening having a greater radial extent from said axis than said one finger whereby the resiliency of said one finger may return it towards its original position subsequent to actuating said switch means.

12. In photographic apparatus as defined in claim 10 wherein said length control means comprises cutting means for severing each of said successive areas of said sheet subsequent to exposure.

References Cited

UNITED STATES PATENTS 3,382,783  5/1968  Chen _____ 95—13

NORTON ANSHER, Primary Examiner

RICHARD L. MOSES, Assistant Examiner

U.S. Cl. X.R.

355—28